United States Patent

Juhl et al.

[15] 3,670,041
[45] June 13, 1972

[54] HYDROGENATION PROCESS

[72] Inventors: William G. Juhl, Seabrook; Roland Libers, Dickinson, both of Tex.

[73] Assignee: Monsanto Company, St. Louis, Mo.

[22] Filed: June 10, 1970

[21] Appl. No.: 45,216

[52] U.S. Cl. ..........................260/674 H, 208/255, 252/414, 260/674 N
[51] Int. Cl. .......................................C07c 7/00, C10g 31/14
[58] Field of Search...................260/674 H, 674 N; 252/414; 208/255

[56] References Cited

UNITED STATES PATENTS

| | | | |
|---|---|---|---|
| 3,277,199 | 10/1966 | Poll | 260/674 |
| 3,429,804 | 2/1969 | Sze et al | 260/674 |
| 1,955,253 | 4/1934 | Russel et al | 252/414 |
| 3,505,206 | 4/1970 | Decker | 252/414 |
| 3,505,207 | 4/1970 | Haney et al | 252/414 |
| 3,565,820 | 2/1971 | Coons et al | 252/414 |
| 3,113,097 | 12/1963 | White et al | 208/255 |

*Primary Examiner*—Delbert E. Gantz
*Assistant Examiner*—C. E. Spresser
*Attorney*—Thomas B. Leslie, L. Dan Tucker and Neal E. Willis

[57] ABSTRACT

An improved method for the selective hydrogenation of olefinic unsaturated impurities present in an aromatic hydrocarbon feed which comprises contacting the aromatic hydrocarbon feed with a suitable selective hydrogenation catalyst and hydrogen under hydrogenation conditions until the activity of the catalyst is diminished, subsequently rejuvenating the catalyst with hydrogen and a hydrocarbon liquid at elevated temperatures and thereafter contacting the regenerated catalyst with additional quantities of the aromatic hydrocarbon feed.

13 Claims, No Drawings

HYDROGENATION PROCESS

BACKGROUND OF THE INVENTION

The present invention relates to selective hydrogenation. More particularly, the present invention relates to a method for the selective hydrogenation of aromatic hydrocarbon feeds containing unsaturated and/or sulfur and nitrogen bearing compounds as impurities and particularly including a method for regeneration of the selective hydrogenation catalyst employed.

Selective hydrogenation is a well-known method for the removal of undesired unsaturated impurities from hydrocarbon streams comprising principally less unsaturated hydrocarbons. For example, it is well known to selectively hydrogenate acetylenic and/or polyolefin hydrocarbons which are present in feed streams consisting principally of monoolefin hydrocarbons. Additionally, it is well known to selectively hydrogenate dienes and other unsaturated impurities present in aromatic hydrocarbon feeds. Such selective hydrogenation may also result in the conversion of sulfur bearing compounds to $H_2S$ as well as conversion of other non-hydrocarbon impurities to acid gases. Among the catalysts which are known for selective hydrogenation are those containing palladium, platinum, cobalt, nickel, molybdenum and mixtures of some of these such as the cobalt-molybdate catalysts.

One of the problems which has resulted from employing many of the above-mentioned selective hydrogenation catalysts involves the regeneration of the catalyst once it has become spent or its activity falls below acceptable limits. Generally, this regeneration has taken the form of a hydrogen purge or regeneration by combustion with air diluted to a low oxygen content. The hydrogen purge technique, particularly as applied to adiabatic operations, has the disadvantage of the relatively poor heat transfer capabilities of hydrogen which result in difficulty in supplying sufficient heat to the catalyst to obtain adequate regeneration. Regeneration by combustion suffers the disadvantage of requiring greater regeneration time and of requiring careful adjustment of the oxygen content of the air. Further, the combustion technique often results in loss of catalytic activity as a result of sintering and deimpregnation of the support of the catalytically active metals.

SUMMARY OF THE INVENTION

It is therefore an object of the present invention to provide an improved process for the selective hydrogenation of hydrocarbon feeds containing as impurities certain unsaturated hydrocarbons and sulfur and nitrogen bearing compounds.

An additional object of the present invention is to provide an improved process for the selective hydrogenation of unsaturated impurities present in aromatic hydrocarbon feeds.

Still another object of the present invention is to provide a new and improved process for the selective hydrogenation of olefinic unsaturated impurities, i.e. monoolefins, diolefins, dienes, etc., in aromatic hydrocarbon feeds.

A further object of the present invention is to provide a new method for the regeneration of catalyst used in the selective hydrogenation of hydrocarbon feeds containing as impurities certain unsaturated and/or sulfur and nitrogen bearing compounds.

Yet another object of the present invention is to provide a new method for catalyst regeneration which is particularly useful in the regeneration of Group VIII metal containing catalysts used in the selective hydrogenation of hydrocarbon feeds containing as impurities certain unsaturated hydrocarbons and/or sulfur and nitrogen bearing compounds.

Additional objects and advantages which are provided by the present invention will be apparent from the following description and the appended claims.

The present invention is a process for the treatment of aromatic hydrocarbon feeds containing as impurities olefinic unsaturated hydrocarbons whereby said unsaturated hydrocarbons are selectively hydrogenated to more saturated hydrocarbons, said process comprising contacting said aromatic hydrocarbon feed with a selective hydrogenation catalyst under selective hydrogenation conditions and in the presence of hydrogen until the catalytic activity of such selective hydrogenation catalyst has diminished, subsequently contacting said catalyst having diminished activity with hydrogen and a hydrocarbon liquid in a molar ratio of from 0.1:1 to 20:1, hydrogen to hydrocarbon liquid respectively, and at a temperature of about 300° to about 600° F for a period of time sufficient to regenerate said catalyst, and thereafter contacting said regenerated catalyst with an additional quantity of said aromatic hydrocarbon feed in the presence of hydrogen.

As a result of the process of the present invention, it has been found that the selective hydrogenation catalyst is maintained at a higher level of activity for longer periods of time than those normally incident to conventional such processes.

DESCRIPTION OF THE PREFERRED EMBODIMENTS

The process of the present invention affords an improved method for the hydrogen treating of an aromatic feedstock. The term "aromatic hydrocarbon feed" or "aromatic feedstock" as used herein refers to any feed material which contains in major amounts aromatic hydrocarbons such as benzene, toluene, xylenes, naphthalenes, etc. In a particular embodiment however, the process is aimed at the hydrogen treating of a feedstock obtained as a by-product in the manufacture of ethylene by the cracking of petroleum condensates, light crudes and the like. Such a feed material are the $C_6$–$C_9$ cracked-oil fractions obtained in the above-described production of ethylene. These $C_6$–$C_9$ fractions generally contain sizeable amounts of diolefins, triolefins and vinyl aromatics such as styrene along with various other non-vinyl aromatic monoolefins, indenes, etc. Usually, such feedstocks also contain objectionable amounts of organic sulfur compounds such as mercaptans, thioethers, thiophenes, etc. The $C_6$–$C_9$ feedstocks are generally referred to as BTX cracked-oil fractions, the BTX of course referring to the benzene, toluene and xylenes respectively. The latter-named aromatics are the principal aromatic compounds present in such a fraction. A typical $C_6$–$C_9$ fraction of the above type will normally have a Bromine Number ranging from 20 to 50, a diene number ranging from 6 to 16, an initial boiling point (ASTM) of from 140° to 180° F and a final boiling point (ASTM) of from 300° to 390° F.

In another preferred embodiment of the present invention, naphthalene concentrate feeds are employed as the aromatic hydrocarbon feed. The term "naphthalene concentrate feed" refers to a generally higher boiling (>350° F) feedstock rich in naphthalenes and alkyl naphthalenes and containing in significant quantities, as impurities, indenes, monoolefins, diolefins and other aliphatic and alicyclic unsaturates. Such naphthalene concentrate feeds may generally be characterized in that they have an API gravity ranging from 8.5 to 12, a Bromine Number of from 15 to 35 and an ASTM distillation as follows: an initial boiling point of from 350° to 415° F, a 10% boiling point of from 415° to 440° F, a 50% boiling point of from 440° to 470° F, a 90% boiling point of from 470° to 500° F and a final boiling point of from 500° to 550° F. While the present invention has particular application to the feedstocks named above, i.e. the BTX fraction and the naphthalene concentrate feed, it is equally applicable to other aromatic feedstocks.

The hydrogenation catalyst to which the process herein is applied can be any of the well-known and widely used hydrogenation catalysts. For example, the hydrogenation catalyst can be any of the noble metals in Group VIII of the Periodic Table of Elements with atomic numbers of at least 27 such as rhodium, palladium and platinum. Also nickel, either unsupported or on a known supporting material can be used. A preferred catalyst in this group, because of its high hydrogenation activity, is palladium or platinum supported on various aluminas with a palladium on alumina being an especially desirable catalyst. Such catalysts, i.e. those containing noble metals as the active component, generally contain from 0.1% to about 5% and preferably from about 0.2% to about 1% by weight of the active metal in the total catalyst. Another preferred group of catalysts include the Group VIB and/or Group VIII Metals or sulfides, either alone or preferably supported on an oxide carrier such as alumina, titania, etc. Combinations of a compound of a metal in Group VIB of the Periodic Table of Elements for example, a chromium, molybdenum or tungsten compound, together with a compound of a metal with the iron group are desired catalysts. In particular, the oxides or sulfides of cobalt and molybdenum supported on alumina or silica-alumina in which the silica is present in a minor amount are especially desirable catalysts. In catalysts of this latter type, the concentration of cobalt may range from about 1% to about 5% while that of molybdenum will range from about 5% to about 20%, both figures being based on the total weight of the catalyst.

Generally speaking, the catalyst employed in the hydrogenation process to which the present invention applies employ porous particle form supports. Such supports are more effective in adequately dispersing and increasing the surface area of the actual catalytic agent used. Suitable porous supports may take the form of natural clays such as Fuller's Earth, kaolin, bentonite; treated clays such as Celite and Sil-o-cel; artificially prepared or synthetic materials such as magnesium oxide, silica gel, alumina gel and the like; or the zeolites; activated carbon; diatomaceous earth; etc. Activated alumina which is a well-known crystalline alpha-alumina monohydrate prepared by the partial dehydration of alpha-alumina trihydrate is a very satisfactory porous support. Other suitable supports include oxide carriers such as titania, zirconia, alumina silicates and the like. As mentioned above, a particularly desirable support for certain catalytic agents is alumina or silica alumina in which the silica is present in a minor amount.

The hydrocarbon liquid employed as the "rejuvenant" or "regenerant" will vary depending on the precise nature of the catalyst being regenerated. The term "liquid" refers to the overall physical state of the rejuvenant, it being understood that hydrocarbons which are normally solid at ambient temperature may also be used by dissolving them in a suitable medium such as a low molecular weight hydrocarbon. In general, the hydrocarbon liquid used as the regenerant can comprise any material which is not subject to or is substantially resistant to hydrogenation under the rejuvenating conditions and which contains a major proportion of hydrocarbons. As will be readily appreciated numerous hydrocarbons fall into this category including the saturated aliphatic hydrocarbons, both branched and straight-chained, the alicyclic saturated hydrocarbons such as cyclohexane, cycloheptane, and the aromatic hydrocarbons such as benzene, toluene, the xylenes, etc. and mixtures of all the above. It should be noted that the rejuvenant or hydrocarbon liquid need not be a saturated material but only need be resistant to hydrogenation under the conditions existing in the hydrogenation reactor. Thus, for example, aromatic hydrocarbons are suitable for use as the hydrocarbon liquid inasmuch as under the rejuvenation conditions employed, virtually no hydrogenation of the aromatic rings occurs. In general, it is preferred that the rejuvenant be a higher molecular weight hydrocarbon or mixture thereof such that it will remain in the liquid phase rather than the gaseous phase under the regeneration conditions.

In cases where the process herein is applied to the hydrogenation of a BTX fraction as that term is defined above, the rejuvenant can comprise a hydrogenated BTX fraction, i.e. a BTX fraction having the properties described above but which has been previously selectively hydrogenated to saturate the monoolefins, diolefins, etc. Likewise, when the process herein is applied to a naphthalene concentrate feed, as that term is defined above, a most desirable rejuvenant comprises a hydrogenated naphthalene concentrate feed, i.e. the product obtained from the selective hydrogenation of a naphthalene concentrate feed. The use of such product streams as regenerants has the advantage that no contamination of the reactants or products in the normal hydrogenation process occurs thus obviating the necessity for an elaborate separation technique downstream from the hydrogenation reaction.

As mentioned above, certain aromatic hydrocarbons make good regenerants. In particular, in this group, the alkyl benzenes composed solely of carbon and hydrogen are most desirable. Typical alkyl groups which may be bonded to the benzene ring include n-dodecyl, n-undecyl, n-decyl, n-nonyl, n-octyl, n-heptyl, n-hexyl, n-pentyl, n-butyl, n-propyl, the positional isomers thereof and ethyl. Non-limiting examples of alkyl benzene rejuvenants of the above-mentioned types include n-dodecyl benzene, 1,4-diamyl benzene, 1,4-diethyl benzene, hexaethyl benzene, and the like. Of the alkyl benzenes, an especially preferred group comprises the methyl benzenes having from one to six methyl groups. While, as stated above, the rejuvenant will contain a major proportion of hydrocarbons, alkyl benzenes containing halogen substituents can also be employed.

The amount of rejuvenant employed is not critical. However, it is preferable that the amount of rejuvenant be sufficient to afford a reasonable reaction time. In general, amounts of rejuvenant from between about 1,000 to 10,000 percent by weight based on the total weight of catalyst can be used. In other words, from about 10 to 100 times the weight of the catalyst are usually used although greater or lesser amounts can be employed if desired. As explained above, the process is carried out in the presence of hydrogen which will generally be present such that the molar ratio of hydrogen to the rejuvenant ranges from about 0.1:1 to about 20:1.

In carrying out the process of the present invention it is usually desirable to choose the rejuvenant or regenerant and the temperatures and pressures such that the rejuvenant is in the liquid state during the regeneration process. Maintaining the regenerant in the liquid state ensures proper contacting of the reactants, i.e. the catalyst, hydrogen and the rejuvenant.

The process proposed herein will generally be carried out at temperatures ranging from about 300° to about 600° F and at pressures ranging from about 30 to about 1,000 psi.

The process can be carried out either batch-wise or as a continuous process. That is to say, when rejuvenation of the catalyst is desired, the reactor containing the catalyst can be charged with the hydrocarbon liquid and hydrogen and regeneration carried out until the catalyst has reached the desired activity. Alternately, the hydrocarbon liquid and hydrogen can be continuously passed through the reactor containing the catalyst. When the latter method of rejuvenation is employed the liquid hourly space velocity of the rejuvenant and hydrogen will range from about 0.01 to 100 with a preferred space velocity being from about 0.01 to about 10.

The time of the regeneration process depends on other process variables. For example, the time of regeneration is dependent upon the activity state of the catalyst being regenerated as well as the reaction temperature, higher temperatures tending to reduce the reaction time. The degree of contact of the catalyst with the rejuvenant and hydrogen is also a contributing factor to the length of time of the rejuvenation process and it is for this reason that the rejuvenant is preferably in the liquid state during the rejuvenation process. In general, reaction or rejuvenation times ranging from 14 minutes to 200 hours are usually adequate.

To further describe as well as to specifically illustrate the process of the present invention, the following non-limiting example is presented.

EXAMPLE

The rejuvenation process of the present invention was applied to a typical hydrogenation process in which various naphthalene concentrate feeds were being hydrogenated. The reactor was packed with a solid catalyst containing 0.3 weight percent palladium dispersed on alumina. Starting from a condition of high catalytic activity, the process was run until the activity of the catalyst was significantly reduced. At this point, rejuvenation was carried out and the hydrogenation process resumed until the catalyst activity had declined once again at which point the rejuvenation process was repeated. In the table below are tabulated various process conditions at different times during the cycle. Samples of the product were taken at the times indicated and the Bromine Number determined.

under selective hydrogenation conditions and in the presence of hydrogen until the catalytic activity of said selective hydrogenation catalyst has diminished, subsequently contacting said catalyst having diminished activity with hydrogen and a hydrocarbon liquid substantially resistant to hydrogenation under the conditions of regeneration in a molar ratio of from 0.1:1 to 20:1, hydrogen to hydrocarbon liquid respectively, and at a temperature of from about 300° to about 600° F for a period of time sufficient to regenerate said catalyst, and

TABLE

| Sample number | 1 | 2 | 3 | 4 | 5 | 6 | 7 | 8 | 9 | 10 | 11 |
|---|---|---|---|---|---|---|---|---|---|---|---|
| Time, hrs | 432 | 1,437 | 2,833 | 2,924–2,966 | 2,987 | 3,012 | 3,036 | 3,427 | 3,531 | 3,531–3,638 | 3,661 | 3,709 | 3,757 |
| Feedstock | NC I [1] | NC I | NC II [2] | HNC [3] | NC II | NC II | NC II | NC II | NC II | AB [4] | NC II | NC II | NC II |
| Pressure, p.s.i.g | 400 | 400 | 400 | 400 | 400 | 400 | 400 | 400 | 400 | 400 | 400 | 400 | 400 |
| Reactor average temperature, °F | 265 | 265 | 265 | 445 | 266 | 266 | 266 | 265 | 265 | 400–500 | 265 | 265 | 265 |
| L.H.S.V. [5] | 2.0 | 2.0 | 2.0 | 2.0 | 2.0 | 2.0 | 2.0 | 2.0 | 2.0 | 1.0 | 2.0 | 2.0 | 2.0 |
| Product/feed recycle ratio | 1:1 | 1:1 | 1:1 | 1:1 | 1:1 | 1:1 | 1:1 | 1:1 | 1:1 | 0:1 | 1:1 | 1:1 | 1:1 |
| $H_2$/feedstock ratio, moles | 4.64 | 4.62 | 2.75 | 2.75 | 2.75 | 2.75 | 2.75 | 2.75 | 2.75 | 5.5 | 2.75 | 2.75 | 2.75 |
| $H_2$/feedstock ratio, s.c.f./bb. [6] | 4,170 | 4,160 | 2,477 | 2,477 | 2,477 | 2,477 | 2,477 | 2,476 | 2,476 | 2,379 | 2,476 | 2,468 | 2,468 |
| Bromine number reduction, percent | 60.8 | 48.1 | 38.5 | | 49.8 | 47.1 | 47.3 | 48.5 | 36.5 | | 59.0 | 51.2 | 47.0 |

[1] Naphthalene concentrate feed, bromine No. 27.
[2] Naphthalene concentrate feed, bromine No. 23.
[3] Hydrogenated naphthalene concentrate feed.
[4] Alkylbenzene mixture containing 95% by weight of alkylbenzenes wherein the alkyl group contains from 11 to 14 carbon atoms.
[5] Liquid hourly space velocity.
[6] Standard cubic feet/barrel.

As the data in the above table clearly demonstrates, the process of the present invention is quite effective in the restoration of catalyst activity in the hydrogenation process. As a measure of catalyst activity, the percent of Bromine Number Reduction is used, lower values indicating less catalyst activity. As can be seen, the fresh catalyst (Sample 1) which had been stabilized by 432 hours of operation had high activity (Bromine Number Reduction equals 60.8%). From this point, the catalyst aged until after 2,833 hours on stream, the activity had dropped considerably (Bromine Number Reduction equals 38.5%). At this point, the rejuvenation process was carried out under which the temperature of the reactor was raised to approximately 445° F for a period of 42 hours. As can be seen from Sample 4 following the rejuvenation process, the catalyst activity was greatly restored (Bromine Number Reduction equals 50%).

From this point on, the catalyst activity again slowly decreased until between 3,500 and 3,600 hours (Sample 8) the catalyst activity had decreased to a point where the rejuvenation process was again carried out. This time the rejuvenation process was carried out for a period of approximately 107 hours using an alkyl benzene mixture instead of the product from the hydrogenation of a naphthalene concentrate feed. As can clearly be seen from Sample 9, catalyst activity was greatly increased (Bromine Number Reduction equals 59.0%).

The above data clearly demonstrates that the process of the present invention is effective in the restoration of the activity of catalysts employed in the hydrogenation of aromatic feedstocks such as naphthalene concentrate feeds.

What is claimed is:

1. A process for the treatment of an aromatic hydrocarbon feed boiling in the range of from 140° to 550° F containing as impurities olefinic unsaturated hydrocarbons wherein said unsaturated hydrocarbons are selectively hydrogenated to more saturated hydrocarbons comprising contacting said aromatic hydrocarbon feed with a selective hydrogenation catalyst thereafter contacting the regenerated catalyst with an additional quantity of said aromatic hydrocarbon feed and hydrogen.

2. The process of claim 1 wherein said catalyst comprises a metal of Group VIII of the Periodic Table of Elements having an atomic number of at least 27.

3. The process of claim 2 wherein said catalyst comprises palladium supported on alumina.

4. The process of claim 3 wherein said aromatic hydrocarbon feed comprises a $C_6$–$C_9$ cracked-oil fraction.

5. The process of claim 4 wherein said hydrocarbon liquid comprises the product from the hydrogenation of a $C_6$–$C_9$ cracked-oil fraction.

6. The process of claim 3 wherein said aromatic hydrocarbon feed comprises a naphthalene concentrate feed.

7. The process of claim 6 wherein said hydrocarbon liquid comprises the product from the hydrogenation of a naphthalene concentrate feed.

8. The process of claim 1 wherein said catalyst comprises a cobalt oxide-molybdenum oxide catalyst.

9. The process of claim 8 wherein said cobalt oxide-molybdenum oxide catalyst is one comprising from about 1% to 5% by weight cobalt and from about 5% to about 20% by weight molybdenum and is on a support selected from the group consisting of alumina and silica alumina in which the silica is present in a minor amount.

10. The process of claim 9 wherein said aromatic hydrocarbon feedstock comprises a $C_6$–$C_9$ feed obtained from the cracking of petroleum condensates and the like.

11. The process of claim 10 wherein said hydrocarbon liquid comprises a hydrogenated $C_6$–$C_9$ cracked-oil fraction.

12. The process of claim 9 wherein said aromatic hydrocarbon feed comprises a naphthalene concentrate feed.

13. The process of claim 12 wherein said hydrocarbon liquid comprises the product from the hydrogenation of a naphthalene concentrate feed.

* * * * *